INVENTOR.
ALAN G. LOOFBOURROW.
BY
Harness and Harris
ATTORNEYS.

UNITED STATES PATENT OFFICE 2,633,937

STRAP BRAKE

Alan G. Loofbourrow, Birmingham, Mich., assignor to Chrysler Corporation, Highland Park, Mich., a corporation of Delaware Application June 24, 1948, Serial No. 34,982

5 Claims. (Cl. 188—77)

My invention relates to planetary transmissions and, more particularly, to an improved means for applying the reversing band to a planetary transmission.

The invention herein disclosed is an improvement of the device shown in Patent No. 1,954,200 to Harry E. Fromm dated April 10, 1934.

The necessity of adjustments of a reversing band on a planetary transmission is obvious due to the wear, stretching, and thermal expansion of the band. In the aforementioned patent to Fromm, these changes in the dimensions of the band are compensated for by a spring pressed member located in one extremity of a rocker arm which tightens the band. As the band wears, stretches, or expands, the spring, compressed between this member and the rocker arm, moves the latter to new position in order to maintain a constant pressure on the reversing band. It has been found desirable to periodically adjust the rocker arm and spring pressed member assembly to maintain a constant length of the spring and thus a more constant pressure.

It is a principal object of my invention to provide the aforementioned rocker arm and spring pressed member assembly of a planetary transmission with means for a flush touch adjustment by the operator, thereby eliminating the necessity of the use of gauges and other mechanical instruments in making precision adjustments.

It is another object of my invention to provide a transmission with means of this character which is not only simple in construction, but economical to manufacture.

Other objects of my invention will become more apparent from the following description taken in connection with the accompanying drawings in which.

Figures 1, 2:
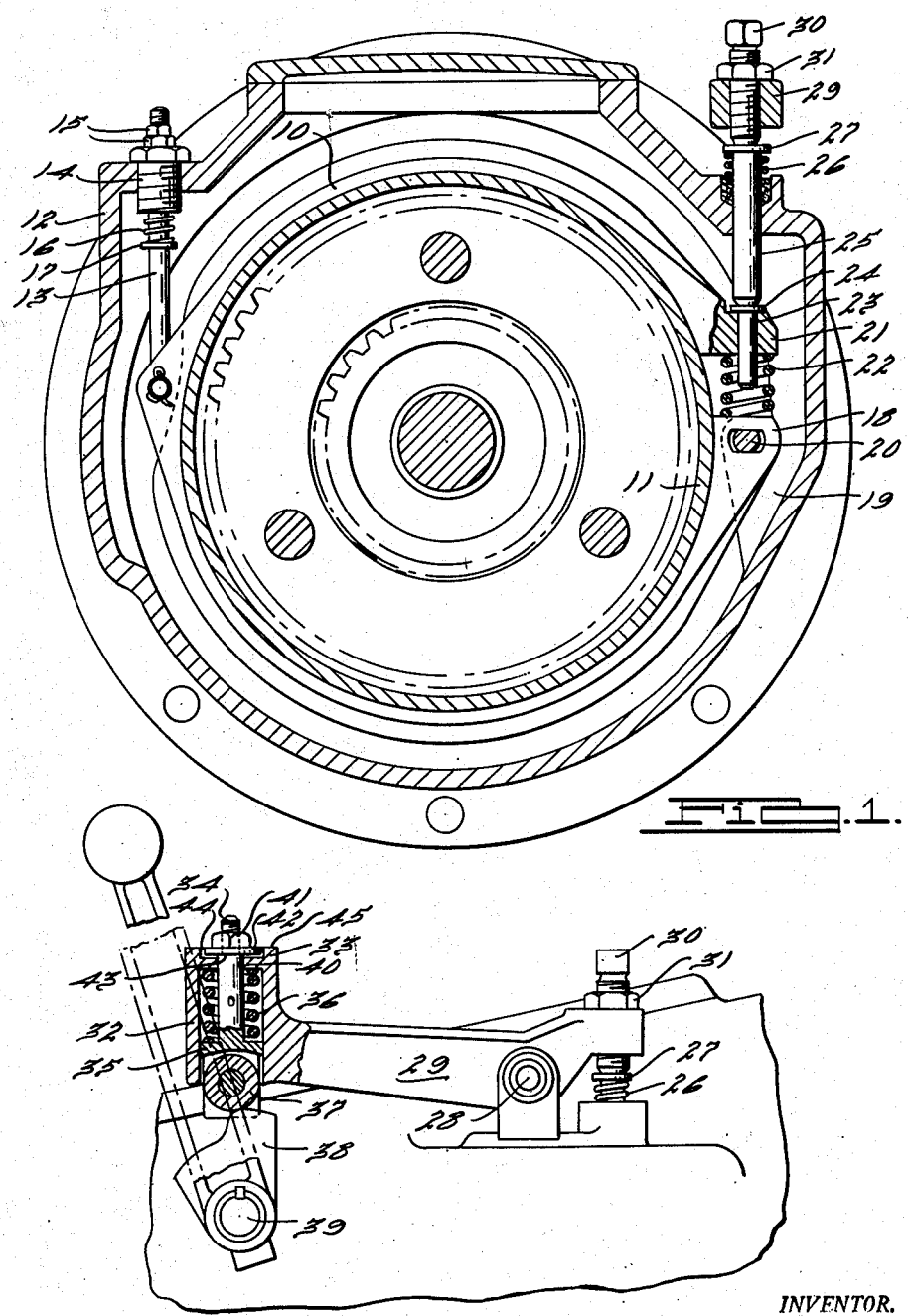
Fig. 1 is a sectional view of a conventional planetary transmission.
Fig. 2 is a fragmentary side elevational view partly in section showing my improved control mechanism for the reversing band.

In the form of the invention shown herein and in the form of transmission mechanism and control shown in the aforementioned patent to Fromm, the driving and driven elements, the rotatable drum and the reversing band of the planetary transmission are all of conventional construction. The transmission includes a clutch and a clutch operating apparatus (not shown) for selectively engaging the driving and driven elements together. Coacting in timed relation with the clutch actuating apparatus is a reversing band control mechanism which is adapted to secure the rotatable drum against rotation when the clutch is released, and to release the rotatable drum when the clutch engages driving and driven elements together.

Referring now to the drawing, a reversing band 10 is concentrically mounted on a drum 11 and secured at its closed side to a housing 12 by an anchor bolt 13 which is shiftably mounted in a plug 14. On the external end of the anchor bolt 13 is a pair of lock nuts 15 by which the closed side of the band 10 may be adjustably positioned, the anchor bolt being yieldably held in a desired position by a spring 16 which bears between a collar 17 on the bolt and the inner end of the plug 14.

The right side of the band 10, as more clearly seen in Fig. 1, is slit and one end 18 of the band is secured to a flange 19 of the housing by a pin 20. The other end 21 of the band 10 is normally urged away from the fixed end 18 by a coil spring 22 which is located between the adjacent extremities of the band and which normally retains the band in a released position. Extending through an aperture in the end 21 of the band is a centering pin 23 having a head 24 on which a pressure pin 25 rests. The pin 25 is slidably mounted in an aperture in the transmission housing 12 and is surrounded by a spring 26 which bears between the housing and a head 27 on the external end of the pin 25.

Pivotally mounted at 28 on the exterior of the housing 12 is a rocker arm 29 having one end located substantially above the head 27 of the pin 25. An adjustable bolt 30 having a lock nut 31 is threaded in the right hand end of the rocker arm 29, as viewed in Fig. 2, and engages the head 27 of the pressure pin 25. The bolt 30 may be set in any desired position by the lock nut 31.

On the opposite end of the rocker arm 29 is a tubular member 32 having a closed upper end 33 and an open lower extremity. A shiftable member, comprising a bolt 34 and a yoke 35, is slidably mounted in the open end of the tubular member 32 and is normally urged upwardly by a spring 36 which bears between the yoke 35 and the closed end 33 of the tubular member. Journaled on the yoke 35 is a cam roll 37 that engages the periphery of a cam 38 which is keyed on a crank 39. The bolt 34 extends through an aperture 40 in the closed end 33 of the tubular member and is secured against displacement by a washer 42 which is retained on the bolt by a shoulder 43 formed on, and a nut 41 threaded on, the bolt 34. The closed end 33 is counterbored to form a cylindrical recess 44 which extends downwardly from the upper extremity 45 of the tubular member 32. The axis of the recess 44 is coincident with the axis of the aperture 40. The washer 42 is adapted to be disposed within the recess 44 and has a diameter slightly less than that of the recess.

In operation, when the crank 39 is rotated in a counterclockwise direction, as viewed in Fig. 2, the crest of the cam 38 urges the roller 37 upwardly, thereby compressing the spring 36 and rotating the right hand end of the rocker arm 29 downwardly. This action causes the adjustable bolt 30 to bear upon the pressure pin 25 which, in turn, applies the reversing band 10 to the periphery of the drum 11 and secures the drum against rotation.

The spring 36 predetermines the maximum force which is applied on the band and, in this way, safeguards the band from distortion. This spring also allows the rocker arm 29 to move relative to the cam 38 during adjustment of the bolt 30 so as to permit a substantial adjustment of this bolt at one time. When the rocker arm 29 is in its applied position, as shown in Fig. 2, and the control mechanism has been properly adjusted by rotation of the bolt 30 so that the predetermined amount of pressure is applied to the reversing band 10, the upper surface of the washer 42 lies in the same plane as the upper extremity 45 of the tubular member 32. The thickness of the washer 42 is predetermined relative to the depth of the recess 44 so that, when the washer is in this position, there is a gap of predetermined dimension between the lower surface of the washer 42 and the floor of the recess 44. By this construction, it is quite obvious that all that need be done by an operator to determine whether or not the control mechanism of the reversing band is in proper adjustment is to merely place a finger upon the upper surface of the washer 42 and the upper extremity of the tubular member 32, while the roller 37 is on the high point of the cam 38. If it is determined by this inspection that the upper surface of the washer is even or flush with the upper extremity 45 of the tubular member 32, then the control mechanism is in proper adjustment. If, however, the reversing band 10 has either worn, stretched, or expanded and the spring 36 has urged the left hand extremity of the rocker arm 39 upwardly to maintain adequate pressure on the reversing band, then the washer 42 will have dropped below the plane of the upper extremity 45 of the tubular member 32 and will have approached the floor of the recess, thereby closing the gap between the lower surface of the washer 42 and the floor of the recess 44. If this has happened, it is readily felt by the finger of the operator since the diameters of the washer 42 and the recess 44 are so nearly the same.

It may be clearly seen that periodic adjustment of the control mechanism is necessary for, when the lower surface of the washer 42 is seated on the floor of the recess 44, the spring 36 is held against further expansion and is no longer able to supply further compression to the band 10 needed because of wear, stretching, or expansion. This frequent adjustment is facilitated by this construction since all the operator need do is place one finger on the top of the tubular member 32 and the washer 42 and thereafter rotate the bolt 30 until the upper surface of the washer 42 is flush with the upper extremity of the tubular member 32. Accordingly, this finger-touch inspection will indicate an excessive downward adjustment of the screw 30, for, in this instance, the upper surface of the washer 42 will be disposed above the extremity 45.

Although but one specific embodiment of this invention is herein shown and described, it will be understood that various changes, including the size, shape, and arrangement of parts, may be made without departing from the spirit of my invention, and it is not my intention to limit its scope other than by the terms of the appended claims.

I claim:

1. In a planetary transmission including a housing, a rotatable drum disposed within said housing, means for releasably securing said drum against rotation, and actuating means for facilitating operation of said securing means; mechanism for applying said securing means comprising a rocker arm adapted to be pivotally mounted on said housing and including a tubular portion having a passage therethrough and a substantially flat end face portion adjacent said passage, an abutment disposed within said passage spaced inwardly from said end face providing the inner wall of a recess having an opening adjacent said face, an adjustable member on said rocker arm adapted to move said arm to a predetermined position, and a shiftable member adapted to bear between said actuating means and said rocker arm to allow said arm to move relative to said actuating means during adjustment of said adjustable member, said shiftable member having a projection thereon disposed within the recess in said tubular member between said end face and said abutment and having a reference surface disposed in the plane of said end face when said arm is in said predetermined position.

2. In a planetary transmission comprising a housing and a rotatable drum, a reversing band substantially concentric with said drum and actuating means for facilitating the operation of said reversing band; mechanism for applying said band to said drum comprising a rocker arm adapted to be pivotally mounted on said housing including a tubular portion having an opening therein and an adjacent end face, an abutment disposed within said opening forming the inner wall of a recess of a predetermined depth in said tubular portion adjacent said end face thereof, an adjustable member on said arm for moving said arm to a position of optimum adjustment, a shiftable member extending into said tubular portion adapted to coact with said actuating means, a spring bearing between said rocker arm and said shiftable member for accommodating relative movement therebetween, and a washer secured to said shiftable member and disposed within said recess between said abutment and said end face and having a surface in the plane of said end face when said arm is in said position of optimum adjustment, the axial thickness of said washer being less than said predetermined depth of said recess and providing a gap between said washer and said abutment to accommodate movement of said rocker arm in response to wear on said reversing band.

3. In a planetary transmission comprising a housing and a rotatable drum, means for releasably securing said drum against rotation and actuating means for facilitating the operation of said means; mechanism for applying said securing means comprising a rocker arm pivotally mounted on said housing and including a tubular portion having an opening therein, an abutment disposed within said opening forming a recess adjacent an end face of said tubular portion, an adjustable member on said rocker arm adapted to move said arm to a predetermined position, a shiftable member adapted to bear between said actuating means and said rocker arm for allowing said arm to move relative to said actuating means during adjustment of said adjustable member, and an adjustment indicating element on said shiftable member within said recess between said abutment and said end face for indicating when said arm is in said predetermined position.

4. In control mechanism including apparatus having a controllable part and a driving control member; shiftable means adapted to be operated by said driving control member including an adjustable element adapted to transmit movement of said member to said controllable part, means adapted to provide a lost motion connection between said shiftable means and said driving control member including a contact element adapted to be engaged with said driving control member and shiftably mounted on said shiftable means, a resilient element bearing between said contact element and said shiftable means for accommodating relative movement therebetween, engageable abutments on said shiftable contact element and shiftable means, respectively, for limiting relative movement thereof in one direction, said shiftable contact element and said shiftable means being relatively shiftable in an opposite direction by adjustment of said adjustable element, and substantially flat reference surfaces on said shiftable contact element and said shiftable means, respectively, which are laterally displaced relative to each other so that they do not oppose relative movement of said shiftable contact element and said shiftable means in said one direction and adapted to indicate when said shiftable contact element and said shiftable means have been moved in said opposite direction to a predetermined position by adjustment of said adjustable element, said reference surfaces being in the same plane and accessible for inspection by finger touch at said aforementioned predetermined position.

5. A rocker arm for planetary transmission control mechanism including a main body portion adapted for pivotal attachment to a transmission, an adjustable contact element on one end of said main body part for imparting control movement to a portion of said transmission, a tubular head portion on the other end of said arm having a substantially flat extremity at one end and a recess adjacent said extremity, an abutment in said tubular head portion defining the bottom of said recess, a shiftable contact member slidably mounted in said tubular head portion including a projecting element disposed in said recess and having a substantially flat surface portion alignable with the flat extremity of said head portion for indicating a predetermined relationship of said shiftable contact member and head portion, and resilient means bearing between the side of said abutment opposite from said recess and said shiftable contact member for yieldably spacing said shiftable contact member and arm.

ALAN G. LOOFBOURROW.

REFERENCES CITED

The following references are of record in the file of this patent:

UNITED STATES PATENTS

| Number | Name | Date |
|---|---|---|
| 1,623,472 | Gurney | Apr. 25, 1927 |
| 1,954,200 | Fromm | Apr. 10, 1934 |
| 2,094,019 | Notter | Sept. 28, 1937 |
| 2,236,346 | Mossinghoff | Mar. 25, 1941 |
| 2,363,165 | Vierling | Nov. 31, 1944 |
| 2,445,176 | Hoffmann | July 13, 1948 |
| 2,448,989 | Leake | Sept. 7, 1948 |

FOREIGN PATENTS

| Number | Country | Date |
|---|---|---|
| 436,368 | Great Britain | Oct. 10, 1935 |